Patented May 28, 1929.

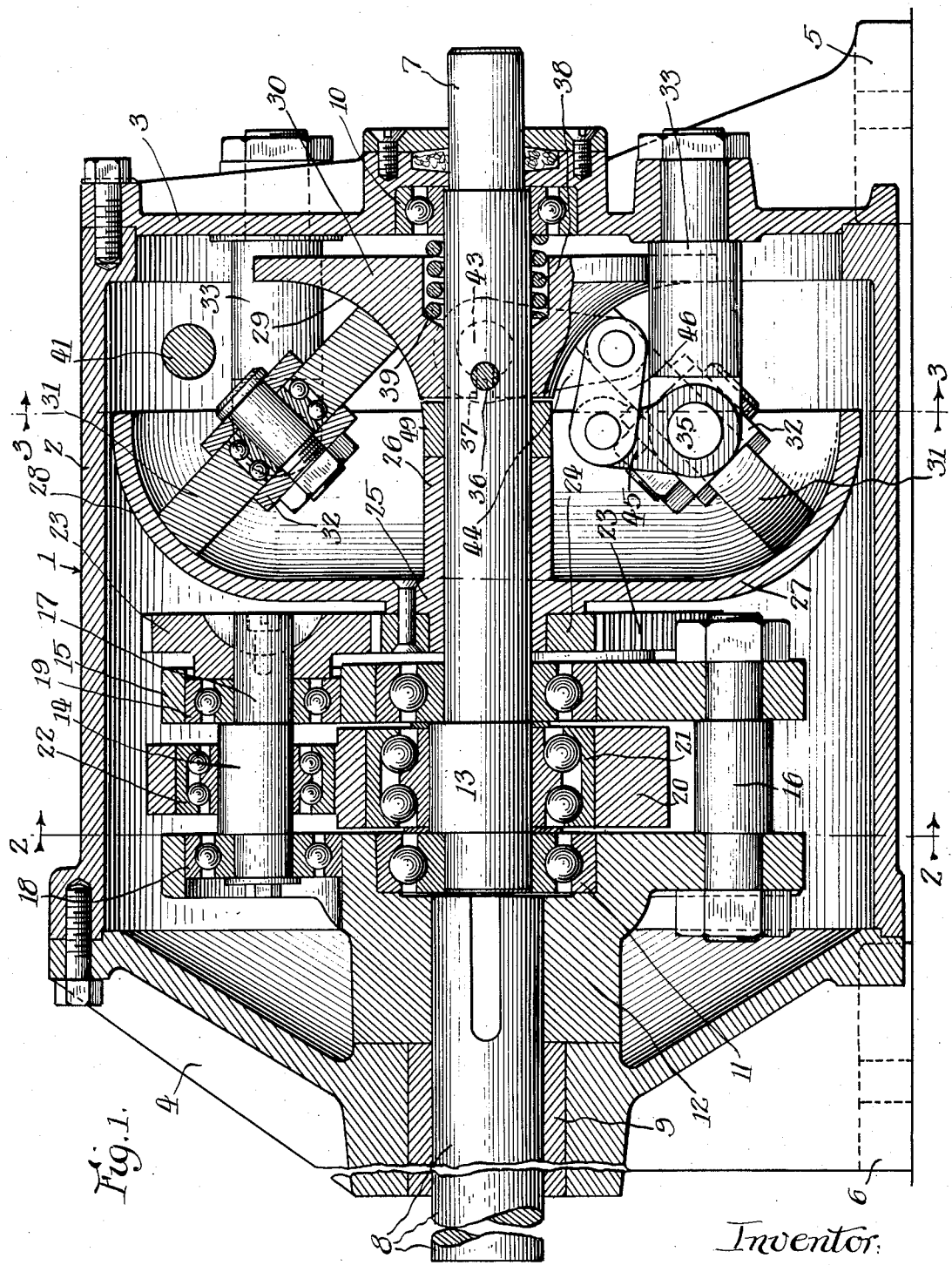

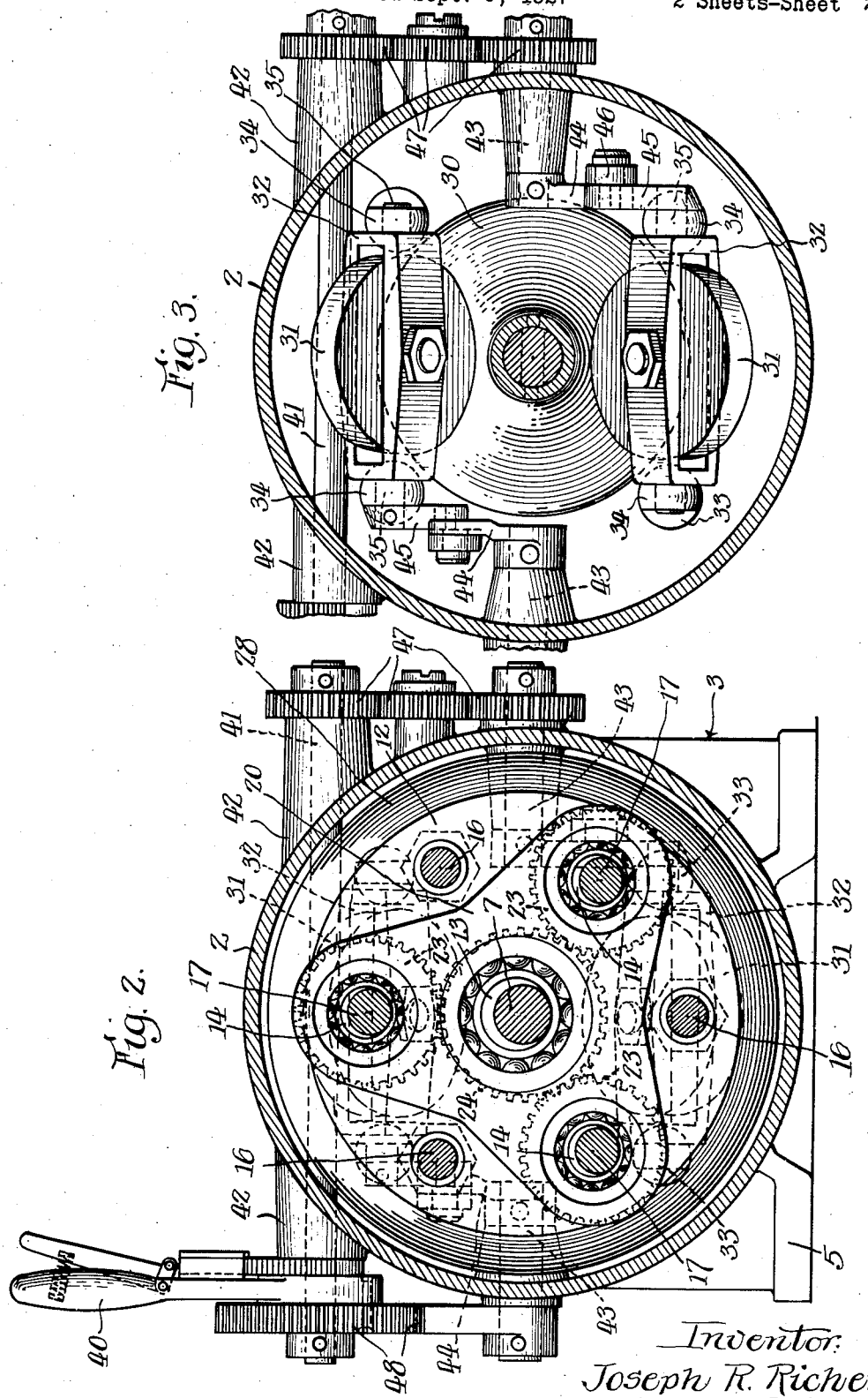

1,715,045

UNITED STATES PATENT OFFICE.

JOSEPH R. RICHER, OF OAK PARK, ILLINOIS.

VARIABLE-SPEED-CHANGE MECHANISM.

Application filed September 9, 1927. Serial No. 218,410.

This invention relates generally to speed change mechanisms and more particularly to a variable speed change mechanism adapted to be embodied in transmission devices wherein it is desired to operate a driven member at a speed different from and variable with respect to a prime mover or driving member.

It is the general object of the invention to provide a new and improved variable speed mechanism arranged to provide a wide range of speeds together with a large number of steps of adjustment.

It is another object of the invention to provide such a mechanism wherein the transmission of power is not directly through friction devices.

It is another object to provide such a mechanism wherein the driving and driven members are mounted in axial alinement and are connected by means arranged to provide for a uniform and positive transmission of power.

It is a further object of the invention to provide a variable speed change mechanism embodying a plurality of rotatable eccentrics associated with the driving and driven members and connected together by means of a linkage together with means to vary the relative speed of the eccentrics on said members.

Other objects and advantages of my invention will be understood from the following detailed description taken in connection with the accompanying drawings which form a part of this specification and in which:

Figure 1 is a longitudinal central section of a preferred form of the invention.

Fig. 2 is a section taken along the line 2—2 of Fig. 1.

Fig. 3 is a section taken along the line 3—3 of Fig. 1.

While the invention is susceptible of embodiment in many different forms I have shown in the drawings and will herein describe in detail one such embodiment, with the understanding that the present disclosure is to be considered as an exemplification of the principles of the invention and is not intended to limit the invention to the embodiment illustrated. The scope of the invention will be pointed out in the appended claims.

In its exemplary form the invention comprises a casing or housing 1 herein illustrated as being built up with a tubular portion or member 2 and end brackets 3 and 4, said end brackets being provided with suitable feet 5 and 6 respectively for supporting purposes. Bearings are mounted in the end brackets in axial alinement with each other for the purpose of supporting a driving member 7 and a driven member 8. Thus as illustrated herein the bracket 4 has a sleeve bearing 9 for the driven member and the bracket 3 has a ball bearing 10 arranged to support the outer end of the driving member. The inner end of the driving member is preferably supported from the inner end of the driven member. This may be accomplished by means of a ball bearing 11 disposed between the inner end of the driven member 7 and a circular head 12 which is keyed to the inner end of the member 8.

In its preferred form the mechanism for connecting the constant speed driving member to the driven member so as to impart a variable speed movement thereto comprises an eccentric 13 on the driving member and a plurality of eccentrics 14 mounted between the head 12 and a disk 15 which is secured to the head by a plurality of spacing bolts 16. As illustrated herein the eccentrics 14 are caried on short shafts 17 rotatably mounted in bearings 18 and 19 in the head and disk respectively, said bearings, as shown most clearly in Fig. 2, being positioned equidistantly from the axis of the driving member. The eccentric 13 and the eccentrics 14 are connected by a linkage herein shown as comprising a somewhat triangular shaped link or member 20 which carries a ball bearing 21 connecting with the eccentric 13 and a plurality of ball bearings 22 connecting with the eccentrics 14. It will be apparent, with the eccentrics 13 and 14 having equal displacements, that by rotating the shafts 17 in unison with the driving member 7 the link 20 will merely be given a planetary movement which will be ineffective for rotating the head 12 and the driven member 8 and that by securing the shafts 17 against rotation the eccentric 13 will act somewhat like a key that would thereby serve to rotate the link 20 and the head 12 in unison with the driving member 7. By providing means to regulate the speed of the shafts 17 so that they rotate in unison with the shaft 7 and at varying speeds lower than that of the shaft 7, the shaft 8 will thereby stand still or be driven at varying speeds.

In the exemplary embodiment of the invention, the means for controlling or regulating the speed of the shafts 17, and thereby the speed of the eccentrics 14, comprises gears 23 mounted one on each of the shafts 17 and in mesh with a common gear 24 which is secured to one member 25 of a variable speed friction device. This friction device is preferably positioned within the casing and at one end thereof, the member 25 having a sleeve-like portion 26 rotatably mounted on the shaft 7 and a radially extending disk-like portion 27 having a circularly sectioned cup-like peripheral edge 28. The inner surface of this edge forms one of the friction surfaces, the other being formed by an opposing and corresponding surface 29 formed on a collar 30 which is also mounted on the shaft 7 and adapted to rotate therewith. Intermediate said friction surfaces are positioned a pair of friction rollers 31 which are rotatably mounted in a pair of frames 32 positioned on diametrically opposite sides of the casing 1. These frames are pivotally supported on the end bracket 3 by means of a plurality of pins 33 which are secured in the wall of the bracket and extend inwardly from the bracket to provide bearings 34 at the opposite ends of the frame 32 and to engage pivot pins 35 on said frames. The collar 30 is preferably secured to the shaft 7 by means of a key 36 which extends through the shaft and into longitudinal slots 37 formed in the inner end of the collar. These slots are provided to permit a slight longitudinal movement of the collar 30 with respect to the shaft so as to permit a spring 38 which is disposed between a shoulder 39 on the collar and the bearing 10 to urge the collar inwardly and provide the proper contact between the rollers 31 and the friction surfaces.

A manually operable lever is provided for pivoting the frames 32 and thereby varying the speed of the friction member 25 with respect to that of the collar 30. This manual control is herein illustrated as comprising a lever 40 (Fig. 2) secured to one end of a shaft 41 which is rotatably mounted transversely of and at one end of the tubular casing portion 2 in projecting bosses 42 thereon. The shaft 41 has its opposite ends connected to the pivot pins 35 by means including stub shafts 43 mounted in and extending through the sides of the casing member 2 and parallel to the shaft 41. The inner ends of these stub shafts are connected to the pivot pins 35 by means of arms 44 on the shafts 43, arms 45 on the pivot pins 35 and links 46 connecting the free ends of said arms. The outer ends of the shafts 43 are geared to the opposite ends of the shafts 41, one shaft being connected by an odd number of gears 47 and the other shaft by an even number of gear elements 48 so that the rollers 31 will be shifted simultaneously in the proper directions.

It will be apparent that by manipulating the hand lever 40 the frames 32 may be pivoted from the position shown in Fig. 1 to a position wherein the rollers 31 will be substantially horizontal in which position of the rollers the friction member 25 will rotate at substantially the same speed as the collar 30, or to a position wherein the rollers 31 will be engaging the smallest portion of the collar 30, in which position of the rollers the member 25 will be driven at a speed reduced from that of the collar or to any other positions intermediate these two extremes. Preferably a short collar 49 is positioned loosely on the shaft 7 intermediate the sleeve portion 26 of the member 25 and the collar 30 so as to permit movement of the rollers 31 into a substantially vertical position (Fig. 1) in which position of the rollers the member 25 will remain stationary.

From the foregoing it will be apparent that with the rollers 31 horizontal the eccentrics 14 are driven in unison with the eccentric 13 and no motion will be transmitted to the shaft 8 and as the rollers 31 are pivoted towards a vertical position by means of the lever 40 and the connections therebetween the member 25 and correspondingly the eccentrics 14 will be driven at decreasing speeds whereby the shaft 8 will be rotated and at increasing speeds.

I claim as my invention:

1. A speed change mechanism comprising, in combination, a housing, driving and driven members rotatably mounted therein, a driving connection between said members including a plurality of eccentrics rotatably mounted on the driven member on axes disposed radially from the axis of the driven member and means connecting the driving member with said eccentrics, and means to control the speed of said eccentrics, said means comprising a pair of conical friction members, means connecting one of said friction members operatively with said eccentrics, means connecting the other of said friction members to the driving member and an adjustable driving connection between said friction members.

2. A speed change mechanism comprising, in combination, a casing, driving and driven members rotatably mounted in axial alinement in said casing, means connecting said members, said means comprising an eccentric on said driving member, a plurality of eccentrics associated with said driven member and a link connecting said eccentrics, and means to drive said plurality of eccentrics.

3. A speed change mechanism comprising, in combination, a casing, driving and driven members mounted in axial alinement therein, a head on said driven member comprising a pair of axially spaced disks, a plurality of eccentrics rotatably mounted in said head intermediate said disks, an eccentric on the driving member intermediate said disks, a member connecting said eccentrics, and means to drive the eccentrics mounted in said head.

4. A speed change mechanism comprising, in combination, a casing, driving and driven members rotatably mounted therein, an eccentric rotatably mounted on said driven member and disposed from the axis thereof, an eccentric on the driving member, an operable connection therebtween, and a driving connection between said driving member and the eccentric on the driven member.

5. A speed change mechanism comprising, in combination, a casing, driving and driven members mounted rotatably therein, and a driving connection therebetween comprising a plurality of eccentrics rotatably mounted one one of said members, means to rotate said eccentrics in unison, an eccentric on the other of said members, and a link pivotally connected with said eccentrics.

6. A speed change mechanism comprising, in combination, a casing, driving and driven members mounted rotatably therein, and a driving connection therebetween comprising a plurality of eccentrics rotatably mounted on the driven member, means to rotate said eccentrics in unison and at variable speeds, an eccentric on the driving member, and means pivotally connected to all of said eccentrics.

7. A speed change mechanism comprising, in combination, a casing, driving and driven members rotatably mounted therein, a driving connection between said members including a shaft rotatably mounted eccentrically of said driven member, a link, means connecting said link eccentrically to said shaft, means connecting said link eccentrically to the driving member, and means to rotate said shaft at a speed different from that of the driving member.

8. A speed change mechanism comprising, in combination, a casing, driving and driven members rotatably mounted in axial alinement in said casing, and means connecting said members, said means comprising a plurality of shafts rotatably mounted eccentrically on said driven member and equidistantly from the axis thereof, a link, means pivotally connecting said link eccentrically to said shafts, means pivotally connecting said link eccentrically to said driving member and means to rotate said shafts, said means comprising pinions on said shafts, a gear meshing with said pinions and a variable speed friction device connecting said gear to said driving member.

9. A speed change mechanism comprising, in combination, a casing, driving and driven members rotatably mounted in axial alinement in said casing, and means connecting said members, said means comprising a shaft rotatably mounted eccentrically on said driven member, a link, means pivotally connecting said link eccentrically to said shaft and to said driving member and means to rotate said shaft, said means comprising a pinion on said shaft, a gear meshing with said pinion, a variable speed friction device connecting said gear to said driving member, and a hand lever arranged to control said friction device.

10. A speed change mechanism comprising, in combination, a casing, driving and driven members mounted rotatably therein, and a driving connection therebetween comprising an eccentric rotatably mounted on one of said members, means to rotate said eccentric at variable speeds, an eccentric on the other of said members, and a link pivotally connected with said eccentrics.

In testimony whereof, I have hereunto affixed my signature.

JOSEPH R. RICHER.